UNITED STATES PATENT OFFICE.

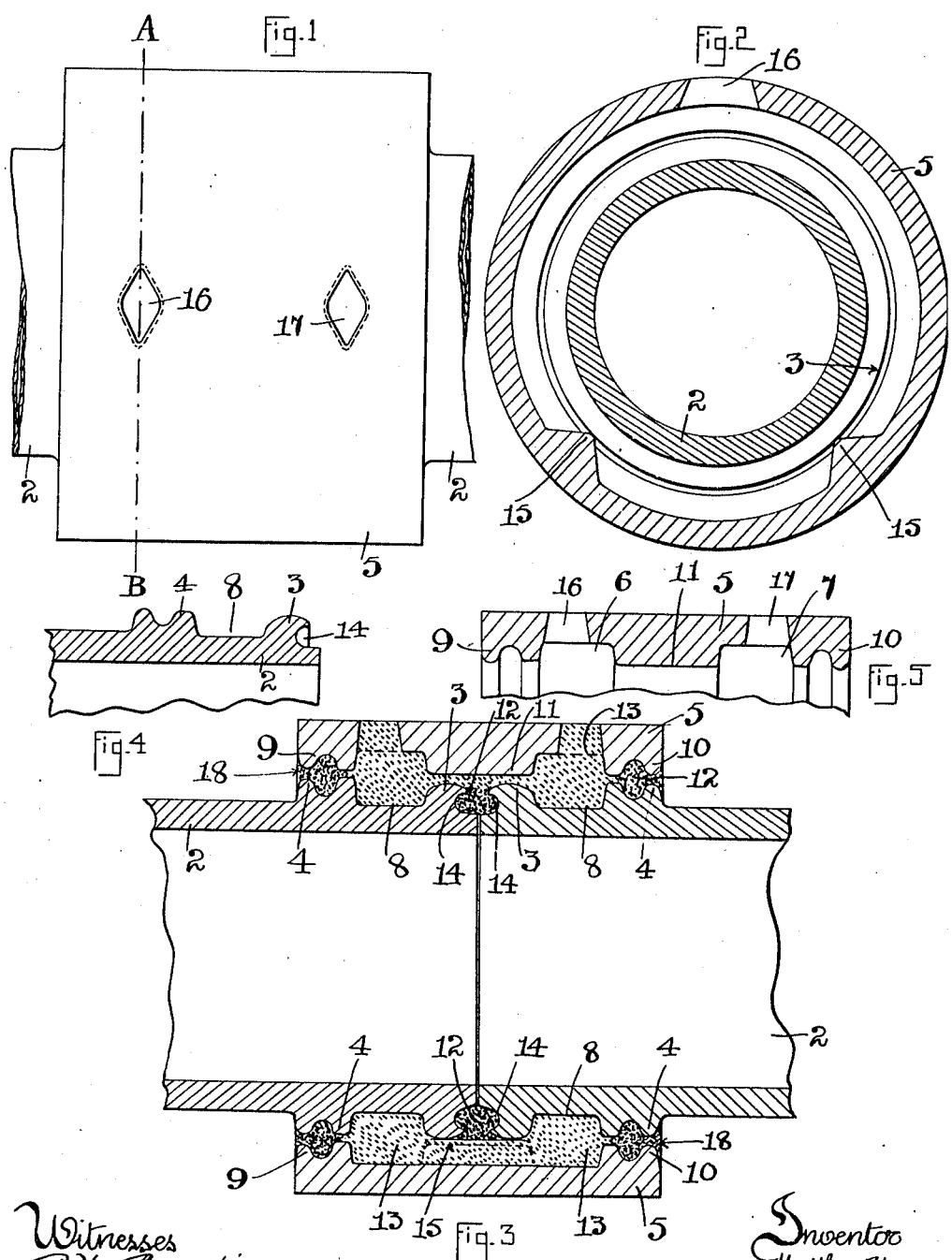

MATTHEW YARROW, OF SMITHILLS, BOLTON, ENGLAND, ASSIGNOR TO YARROW AND COMPANY (BOLTON) LIMITED, OF BOLTON, ENGLAND.

DEVICE FOR FORMING JOINTS IN PIPES OR MAINS.

978,346.  Specification of Letters Patent.  Patented Dec. 13, 1910.

Application filed October 2, 1907. Serial No. 395,567.

*To all whom it may concern:*

Be it known that I, MATTHEW YARROW, a subject of the King of Great Britain, and resident of 9 Ivy road, Smithills, Bolton, in the county of Lancaster, England, have invented a certain new and useful Improvement in Devices for Forming Joints in Pipes or Mains, of which the following description, wherein reference is made to the accompanying sheets of drawings, is a specification.

This invention relates to an improved method of and means for forming joints in pipes or mains and consists in so shaping or forming the outer or abutting ends of the pipes or mains that are to be jointed together that they will take within annular sleeves or rings made to receive them and in such a manner that cavities are formed between these parts for the reception of the jointing substances. To attain this object, use is made of the devices illustrated in the accompanying sheets of drawings wherein:—

Figure 1 is a plan or view as seen from above of my improved device with the ends of two pipes inserted therein. Fig. 2 is a cross sectional elevation on line A—B of Fig. 1. Fig. 3 is a longitudinal section of parts shown by Fig. 1. Fig. 4 is a sectional view showing a portion of the outer end of a pipe or main as formed for use in connection with my improved device. Fig. 5 is a sectional view showing the formation of my improved device in detail.

Similar figures and letters of reference indicate similar parts throughout the several views.

In carrying my invention into effect the pipes or mains, which are to be jointed together have each two annular flanges 3, 4, formed on them to take within annular sleeves or hoops 5 made to receive them. One hoop 5 is made to receive the two ends of the mains 2 which are to be jointed together. Within this sleeve or hoop 5 two annular grooves 6, 7 are formed to correspond with the two outer annular grooves 8, 8, formed between the flanges 3, 4 on the ends of the two pipes.

Adjoining the annular grooves 6, 7 in the sleeve or hoop 5 are the internal flanges 9, 10 and 11 the two former of which have their inner surfaces grooved to fit over grooves made in the annular flanges 3, 4 on both of the mains 2 so that spaces of proper shape in cross section are provided for inserting calking or packing material 12 to form temporary joints adjoining the annular spaces which are to receive the liquid or semi-liquid sealing or jointing substance 13 afterward to be poured or run therein.

As means for forming the temporary joint between the two abutting ends of the pipes or mains 2, so as to provide against leakage of the jointing substance 13 in this direction an annular groove 14 is formed in the face of the end or extremity of the pipe 2 or in the flange 3 adjoining the same so that the temporary packing or jointing material 12 may be placed therein and retained between the two flanges 3 when these are placed together prior to the pouring in of the joint-forming substance 13 so that this latter is or may be thereby retained.

The sleeve or hoops 5 are formed with internally projecting pieces 15 for the flanges 3 on the ends of the pipes 2 to rest upon to secure their alinement, and openings 16, 17 are formed in the hoops 5, so that the jointing substance may be poured through one of them while the air displaced by it may escape through the other until both annular spaces are filled and the joint properly formed, or only one or other of these openings may be made in said hoops 5 as the flowing of the jointing substance may be found to be effected through such single opening.

The flanges 4, and 9 and 10 are tapered or inclined, as shown and rounded to form annular openings 18 adapted to permit the insertion of a calking tool when the pipes and hoops are of metal, or to allow the admission of repairing material to faulty or weakened parts of such joints, as may from time to time be found necessary.

Such being the nature and object of my said invention, what I claim is:—

1. The combination with two pipe members having their ends in alinement and provided with flanges having coinciding grooves constructed to receive calking material, each of said pipe members being also provided with a tapered flange spaced from said first mentioned flange, of a sleeve having interally beveled flanges coöperating with the tapered flanges of said pipe members, said sleeve being provided with a plurality of openings.

2. The combination with two pipe members having their ends in alinement and provided with flanges having coinciding grooves constructed to receive calking material, each of said pipe members being also provided with a tapered flange spaced from said first mentioned flange and having a rounded edge, of a sleeve having internally beveled flanges provided with rounded edges and coöperating with the tapered flanges of said pipe members, the tapered flanges of said sleeve and the internally beveled flanges of pipe members being provided with annular grooves, said sleeve being provided with a plurality of openings.

In testimony whereof I have affixed my signature in presence of two witnesses.

MATTHEW YARROW.

Witnesses:
 SAMUEL HEY,
 JOHN WHITEHEAD.